(12) United States Patent
Roberts et al.

(10) Patent No.: US 7,754,271 B2
(45) Date of Patent: Jul. 13, 2010

(54) METHOD FOR FOLDING COOKED EGGS

(75) Inventors: Donald Roberts, St. Michael, MN (US); Jamie Stout, Otsego, MN (US); Anthony L. Seidenkranz, Clearwater, MN (US); Nancy Ullrich, Elk River, MN (US)

(73) Assignee: Cargill, Incorporated, Wayzata, MN (US)

( * ) Notice: Subject to any disclaimer, the term of this patent is extended or adjusted under 35 U.S.C. 154(b) by 1461 days.

(21) Appl. No.: 11/128,812

(22) Filed: May 13, 2005

(65) Prior Publication Data

US 2005/0268795 A1 Dec. 8, 2005

Related U.S. Application Data

(60) Provisional application No. 60/571,430, filed on May 14, 2004.

(51) Int. Cl.
*A47J 37/10* (2006.01)
(52) U.S. Cl. .................. 426/614; 426/512; 426/524
(58) Field of Classification Search .............. 426/614, 426/512, 524
See application file for complete search history.

(56) References Cited

U.S. PATENT DOCUMENTS

| | | | | |
|---|---|---|---|---|
| 3,548,153 A | * | 12/1970 | Kells | 219/400 |
| 3,753,737 A | * | 8/1973 | Latham et al. | 426/523 |
| 3,759,721 A | * | 9/1973 | Hawley | 426/509 |
| 3,782,269 A | * | 1/1974 | Latham et al. | 99/427 |
| 3,920,370 A | * | 11/1975 | Miller | 425/363 |
| 3,958,035 A | * | 5/1976 | Stearns et al. | 426/614 |
| 4,014,254 A | | 3/1977 | Ohkawa | |
| 4,940,866 A | | 7/1990 | Hauton et al. | |
| 6,477,943 B2 | | 11/2002 | Janecka | |
| 2005/0186321 A1 | * | 8/2005 | Ullrich et al. | 426/614 |

* cited by examiner

*Primary Examiner*—Anthony Weier

(57) ABSTRACT

The present invention relates to a method, system and apparatus for making egg patties which have been cooked, folded, frozen and which may be reheated to provide an egg patty which resembles an egg patty made form fresh eggs. The invention includes an egg folding apparatus, a method for folding cooked liquid whole egg and a system for cooking and folding a cooked egg composition. The egg folding apparatus includes an endless linear array of egg cooking pans movable as an endless conveyor. One side of the pans has a ramp which extends downward to the bottom pan. A plurality of spatulas are disposed above the pans in an array above the pans. The spatulas are rotatable about an axis which is perpendicular to the linear array of pans, the pans movable upwardly away from the pans and downwardly toward the pans. As the pans move toward the spatulas, the spatulas move downwardly onto the ramp of the pan, move under the coagulated egg composition and rotate such that they fold cooked eggs in the pans onto themselves as the pans move past the spatulas. The invention also relates to a method of packaging, freezing and thawing packaged frozen folded egg patties.

18 Claims, 8 Drawing Sheets

METHOD FOR FOLDING COOKED EGGS

CROSS REFERENCE TO RELATED APPLICATION

This application claims the benefit of U.S. Provisional Application No. 60/571,430, filed May 14, 2004.

FIELD OF THE INVENTION

The present invention is generally directed to folding cooked liquid egg products. More particularly, the present invention relates to a method, apparatus and system for making egg patties which have been cooked, folded, frozen and then are intended to be reheated to provide an egg patty which resembles an egg patty made from fresh eggs. The invention also is directed to a method for packaging, thawing and reheating the frozen cooked folded egg patties.

BACKGROUND

Egg products for use in food articles may be made on a commercial scale by depositing a liquid egg mixture into a mold or belt and cooking the liquid egg mixture. Egg patties produced by these types of processes tend to have a commercial processing appearance and do not have acceptable organoleptic properties, are not appetizing, and do not have desirable homemade or handmade appearances.

Previous commercial egg patties tended to be dense and lacked the fluffy texture of fresh scrambled eggs. Previous commercial egg patties also differed in color than the bright yellow appearance of fresh eggs. Additionally, previous commercial egg patties lacked the flavor and aroma of fresh scrambled eggs. Therefore, a need exists to improve egg patties to have a light, tender and slightly moist texture; bright yellow appearance; and a flavor and aroma more reminiscent of fresh scrambled eggs.

Those making egg patties for commercial sale and consumption also desire the egg patty to be folded. Folded eggs not only look better and appear larger because of a puffy appearance, they maintain moisture better during reheating than a single layer egg patty. This probably is because the folded egg patty has less surface area from which to lose moisture than a flat, single layer egg product.

Previous to the invention described herein, liquid egg, such as liquid whole egg, would be cooked in a mold and then folded by hand during or just after cooking. Frequently the desired folded egg patty would be folded into thirds. Commercially available liquid whole egg or pasteurized liquid whole egg has not folded well and a good looking tri-folded egg product has been difficult to obtain on a consistent basis without a lot of waste. Moreover, no known apparatus exists to fold cooked egg products on a large scale basis for later freezing and reheating.

SUMMARY

The invention includes an egg folding apparatus which includes an endless linear array of egg cooking pans which move from an upstream to downstream as an endless conveyor. The pans are preferably rectangular and have at least three side walls, a bottom, and a ramp which extends angularly downward to the bottom. Preferably the bottom and three side walls are flat with the sidewalls extending perpendicular to the bottom. The ramps are on the forward end of the pans and are at the lead ends of the pans as they move in the downstream direction on a conveyer in a cooking oven.

A plurality of spatulas are arrayed above the pans. The spatulas are aligned with the pans so that they may slide under a cooked or coagulated egg in the pan when the pan moves past the spatula and the spatula moves downward to abut the ramp and then bottom of the pan. The spatulas are attached to a control rod. Preferably with high speed there are two control rods which are rotatable about axes which are perpendicular to the linear array of pans and perpendicular to the downstream direction of movement of the pans to the downstream. The control rods not only pivot the spatulas, but also move the spatulas downward to the pans and upwardly away from the pans as the pans move to the downstream. The spatulas are held from the control rods at an angle that is about the angle of the downwardly extending ramp at a point which the leading edge of the spatulas engage the ramp as the spatulas slide under the egg as the pans move toward the spatulas. After the leading edge of the spatulas engage the ramp, the pans move to the downstream the control rods pivot spatulas through an angle which is to the upstream which has the effect of folding the generally planar coagulated or cooked egg onto itself. This pivoting action is achieved by rotating the control rod which pivot the spatulas. The angle of the ramp may broadly be from about 1° to about 40°, but in an important aspect, the angle is from about 10° to about 18°. As the leading edge of the spatulas engage the ramp, the angle of the generally planar spatula will be about the same as the angle of the ramp. As the pans move to the downstream, the control rod will pivot the spatulas. This pivoting action will move the spatulas to not more than about 180° e.g. horizontal, but in an important aspect the spatula will move toward the downstream to about 120° from the horizontal.

The eggs in the pans may be trifolded with the first fold being completed by the first line of spatulas on the control rod. The second fold then is completed by the second line of spatulas on the control rod which is downstream the first control rod with the spatulas that completed the first fold. These two folds make a "trifolded egg" which is an egg folded in three sections which form the layers of egg. With a high speed apparatus, there will be two lines of two control rods: the first two lines for the first fold; the second two control rods for the second fold.

The method of the invention includes adding liquid egg into a plurality of cooking pans in an endless linear array as described above in connection with the egg folding apparatus. The eggs in the pans then are cooked to the point where they at least have begun to coagulate in the pans as the pans are preferably moved through an elongated heating area. As the pans move through the heating area, they also move the coagulating or cooked egg in the pans toward a plurality of spatulas in the folding apparatus as described above. The spatulas have bodies which are generally flat in an array above the pans, are rotatable about an axis which is perpendicular to the linear array of pans, and are movable upwardly away from the pans and downwardly toward the pans. In the method, the leading edges of the spatulas are moved down onto the downwardly extending ramp of the pans as the pans move toward the flat spatulas. The flat spatulas are held at an angle that is about the angle of the downwardly extending ramp at a point of engagement of the spatulas with the ramps and are slid under the cooked or coagulated egg patties as they travel in the pans past the spatulas. As this sliding action occurs, the spatulas are rotated through an angle that is effective for folding the coagulated egg over onto itself as the pans move past the spatulas toward the downstream end of the endless linear array of pans.

The system of the invention includes adding to the pans an egg blend which includes liquid whole egg, an edible oil, an amount of freeze-thaw stabilizer effective for providing freeze-thaw stability, flavor, a gum to suspend the freeze thaw stabilizer, phosphates and an amount of pH controller effective for providing a pH 7.2 or less, preferably a pH of 6.4 to 7.2, more preferably a pH of 6.8 to 7.1, and most preferably a pH of 7.0 to 7.1. A modified food starch is an especially important and unique freeze-thaw stabilizer. Liquid whole egg is present in the egg blend in an amount effective for providing desired flavor, texture and aroma. In this aspect of the invention, the egg patty blend includes at least 90 weight percent, preferably from 95 to 98.5 weight percent, and more preferably 97 to 98 weight percent liquid whole egg based on the weight of the blend before cooking. In a very important aspect of the system, the modified food starch is cornstarch. Modified cornstarch has a strong crosslinked structure which can tolerate abusive processing conditions. The blend then is cooked by depositing it into a pan having a temperature of from 220° F. to 310° F., preferably 255° F. to 285° F. After deposit of the blend into the pans, it is cooked by moving it through an elongated insulated oven to cook the egg blend preferably without application of additional external heat, for 30 to 180 seconds, preferably 30 to 65 seconds. When the egg is sufficiently coagulated such that it may be folded, it is folded by the method and apparatus as described above. Generally this is when the egg emerges from the elongated oven.

After cooking the folded egg patties are frozen in a freezer having a temperature of from −60° F. to 0° F. for a dwell time of 5 to 7 minutes in an impingement freezer which circulates air to shorten dwell time, or from 20-22 minutes at −40° F. to −60° F. in a regular freezer. In one aspect, the folded egg patties are packaged in flat packs of polymeric film by placing the frozen cooked folded egg patties onto a film surface, sealing the patties, preferably as a single layer, between the bottom and a top layer of film. Thereafter, the sides of the flat pack are sealed. The flat packs are ideal for thawing and reheating the frozen folded egg patties. At the point of reheating and serving the frozen egg patties, the flat packs are removed from a freezer and placed into racks where the flat packs and egg patties are laid flat to thaw. After thawing the packs are opened and the folded egg patties removed from the pack for reheating, such as on a grill.

DETAILED DESCRIPTION

The Apparatus and Method

Figure 1:
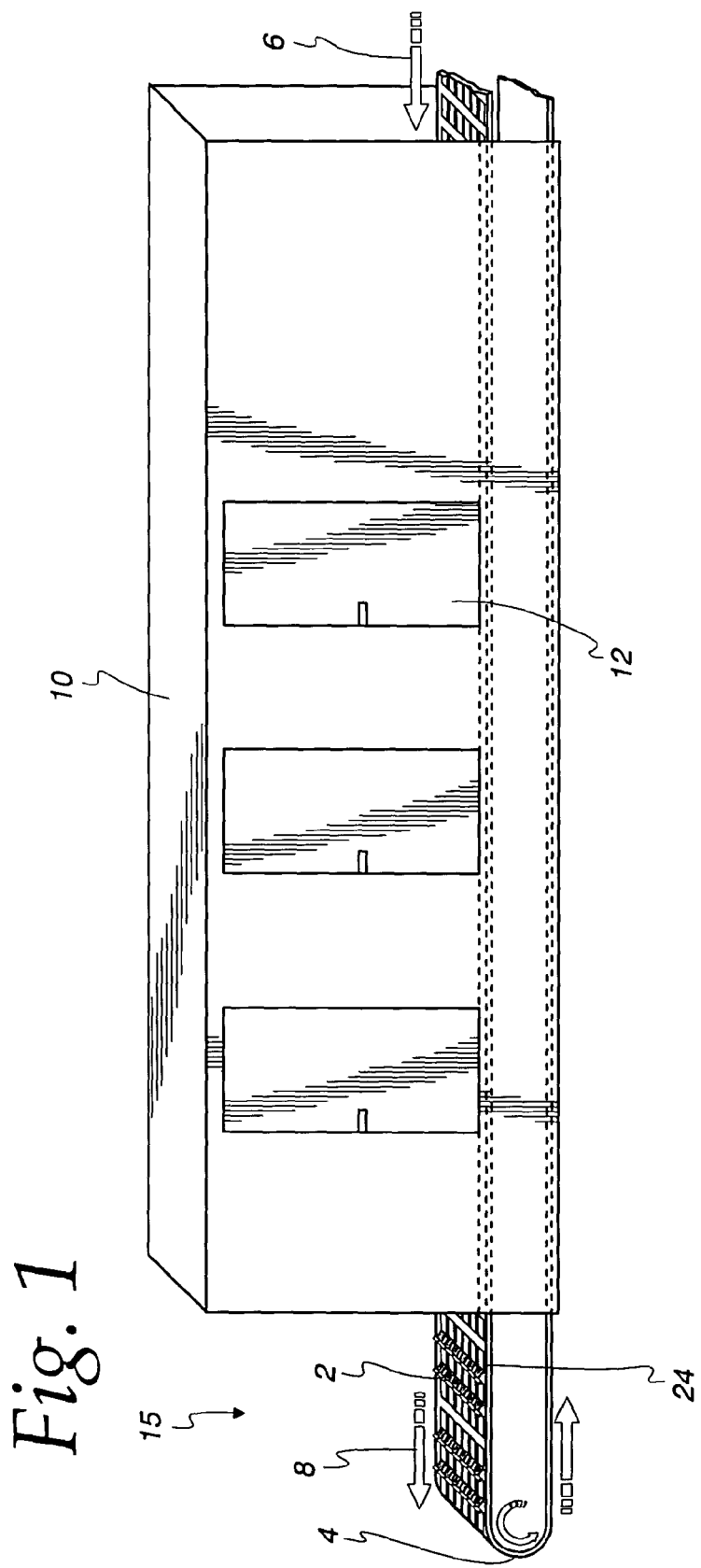
FIG. 1 is a schematic side view of the heating apparatus, spatulas, conveyor and pans on the conveyor.

As seen in FIG. 1, according to the invention, a line of pans 2 move on an endless conveyor 4 which moves the pans from the upstream to the downstream pass spatulas 24, as seen by arrows 6 and 8. The conveyor 4 runs through an insulated heating apparatus 10 which has access doors 12.

Figure 2:
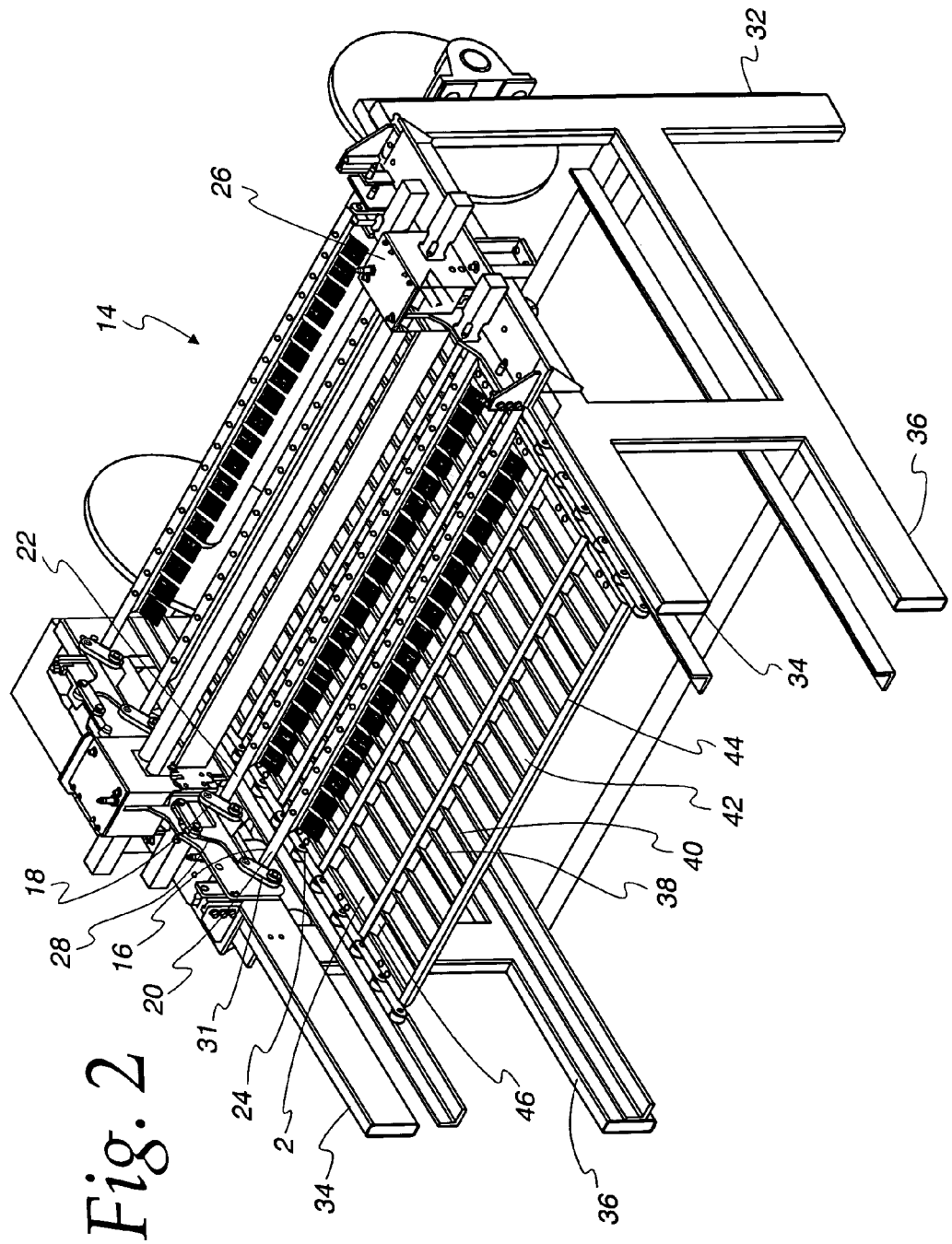
FIG. 2 is a perspective view of the egg-folding apparatus at the downstream end of the heating apparatus, the folding apparatus including pans on the conveyer and the spatulas on the control rods.
Figure 5A:
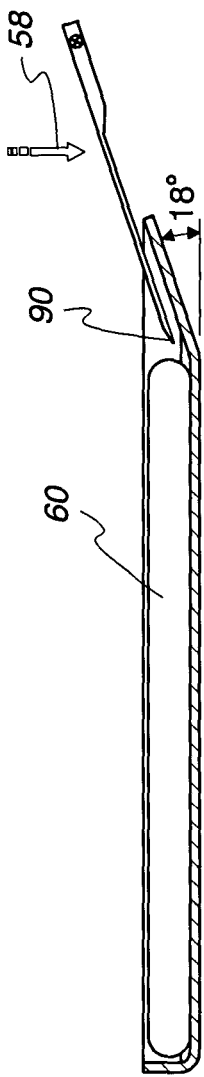
FIGS. 5(a) through 5(f) are a schematic diagrams which show the folding action of the spatulas as viewed from the side as the eggs in the pan move downstream.

FIG. 2 shows the egg-folding apparatus 14 which is at the downstream end 15 of the heating apparatus 10. Two lines of spatulas 16, 18 are mounted on control rods 20, 22 above an array of pans 2. The spatulas 24 are mounted on the control rods for movement down toward the pans and upward away from the pans, as well as for pivoting the spatulas as the ends of the spatulas attached to the control rods are pivoted through an angle of about 120° from the horizontal (see FIG. 5c). The control rods are connected a servo motor 26 through linkages 28 and 30 (FIG. 3) at each end of the control rods. The control rods, linkages and servo motor all are mounted on a support which includes legs 32 and horizontal supports 34, 36 which extend into the downstream end of the heating apparatus. The pans 2 include two upwardly extending side walls 38, 40 which are perpendicular to flat bottom 42. The pan has a backwall 44 which also extends vertically from and is perpendicular to bottom 42. A ramp 46 extends angularly and downwardly toward the bottom of the pan.

Figure 3:
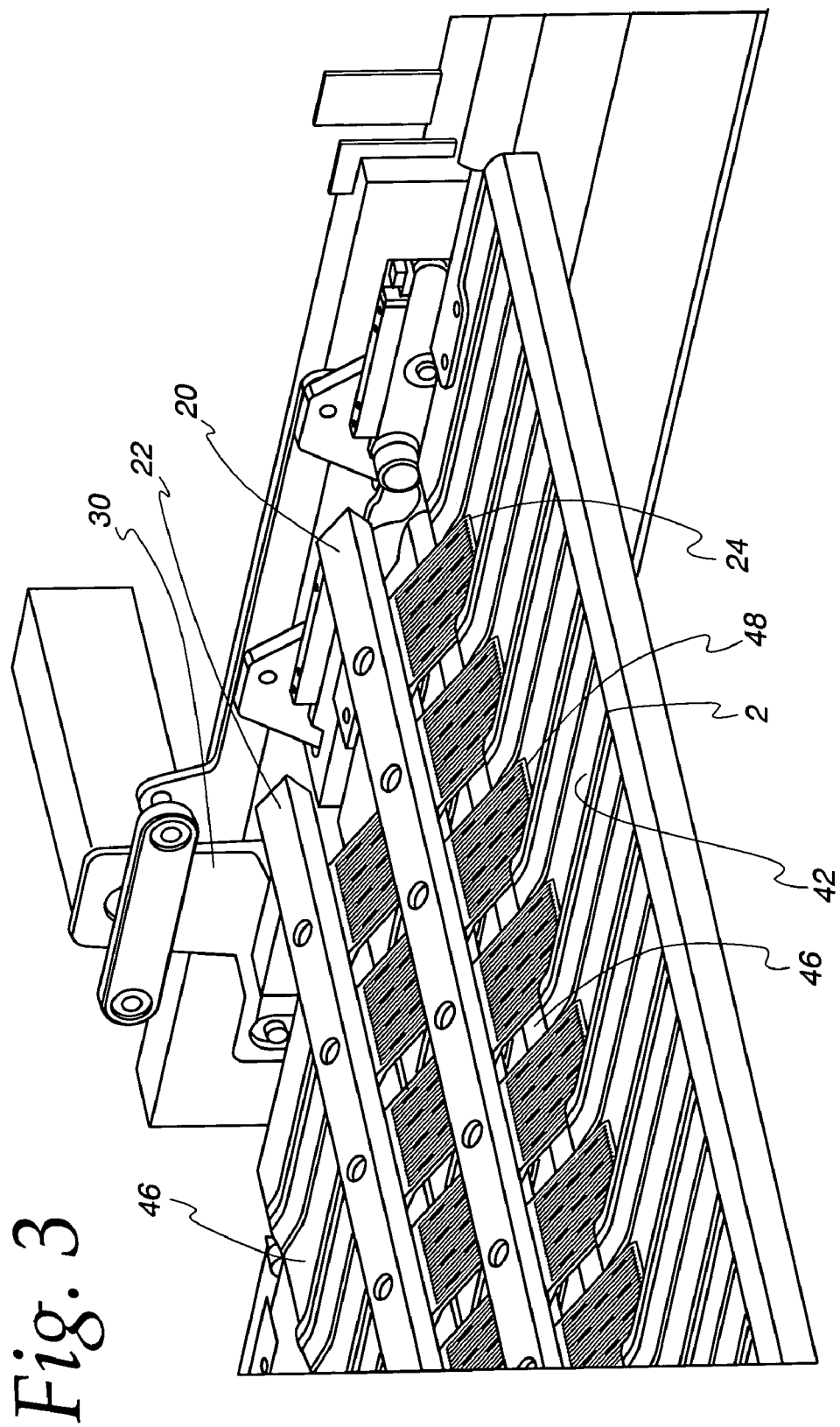
FIG. 3 is a perspective view of the spatulas on the control rods viewed from the upstream end of the folding apparatus.

FIG. 3 shows the spatulas 24 mounted on control rods as seen from the upstream direction looking from the direct of the heating apparatus 10. In FIG. 3, the spatulas have been moved down by the control rods, have slid down the ramps 46 of the pans, and are slidingly engaging the bottoms 42 of the pans (cooked eggs are not shown in the figure as the pans move pass the spatulas). After the leading edge 48 of the spatulas have slid about one-third the length of the downstream moving pan, the control rods 20, 22 pivot clockwise (as would be seen in FIG. 3) through an angle of about 120° from the horizontal (see FIG. 5c) to make the first fold in the egg (see FIG. 5c). The speed of the line of pans is such that the two lines of spatulas 20, 22 are needed to make the first fold in the pans traveling under the spatulas with a second two lines of spatulas 50, 52 (see FIG. 4) folding the already folded egg a second time to make the tri-folded cooked egg. The second two lines of spatulas operate in generally the same way as the first two lines of spatulas. The spatulas which are at an angle of about 18° from the horizontal (see FIG. 5a) move down on the pan, slide down to the bottom of the pan engage the first folded egg (see FIG. 5e), whereupon the control rods pivot through an angle of about 120° to make the second fold in the egg (see FIG. 5f). The control rods are connected at each end to push rods 31. When the linkages 30 are pushed toward the upstream by the servo motor, the push rods pivot the control rods and spatulas.

Figure 4:
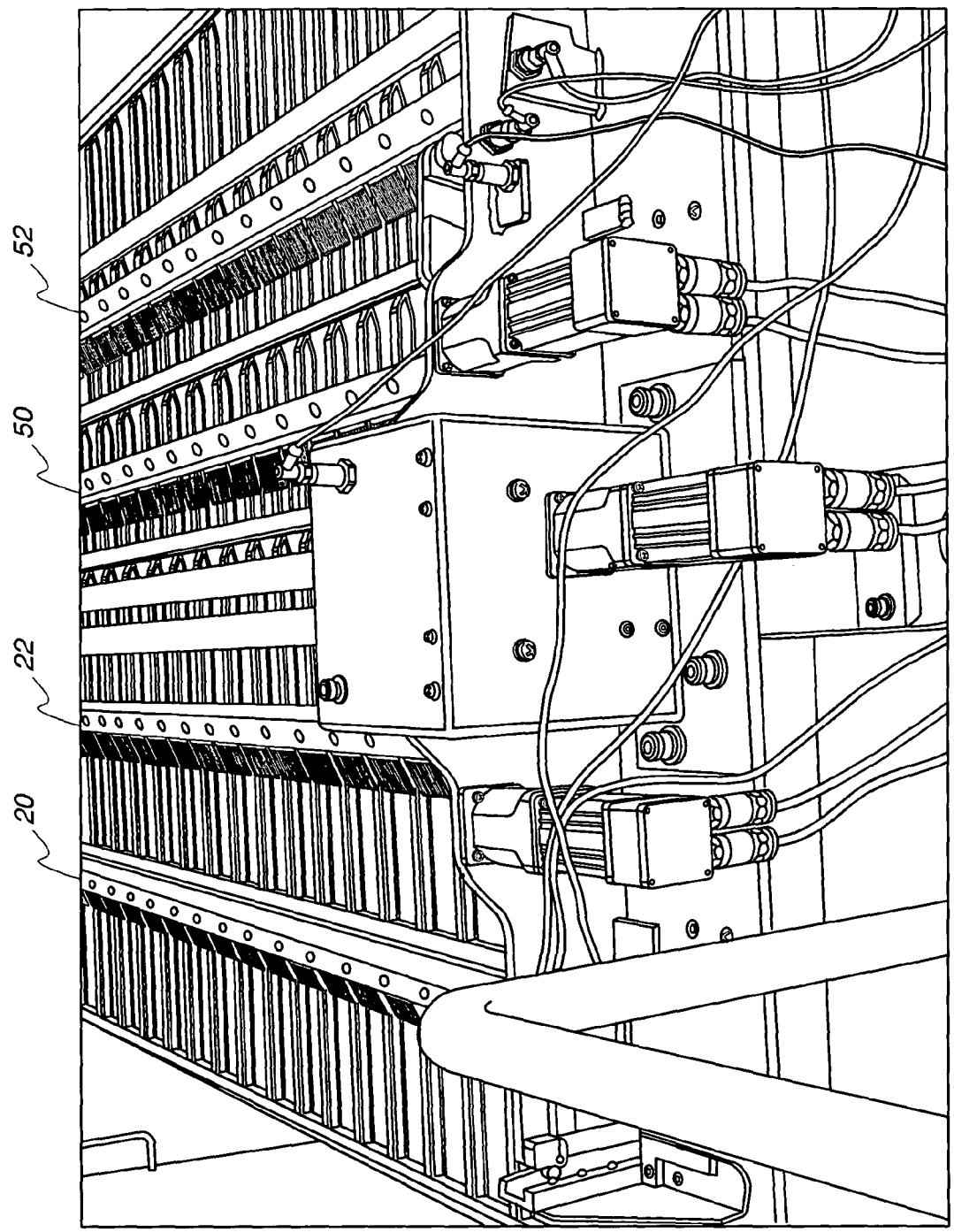
FIG. 4 is a side view of the egg-folding apparatus.
Figure 5B:
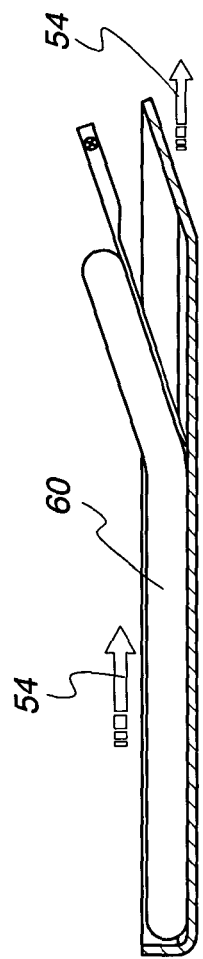
Figure 5C:
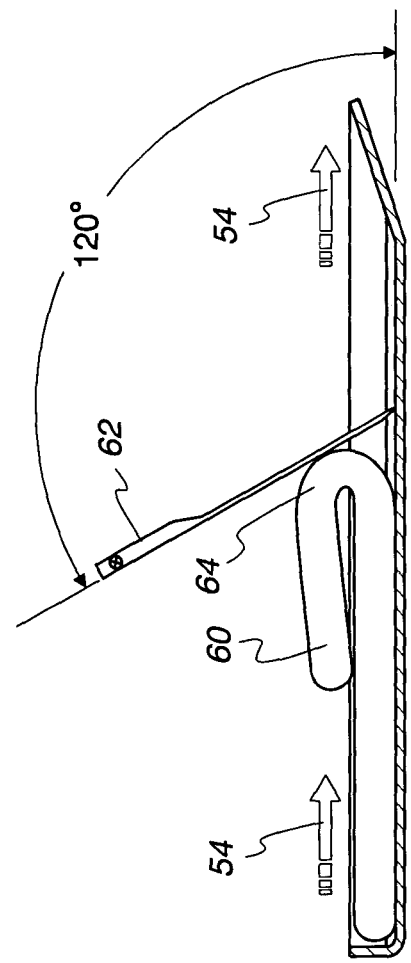
Figure 5D:
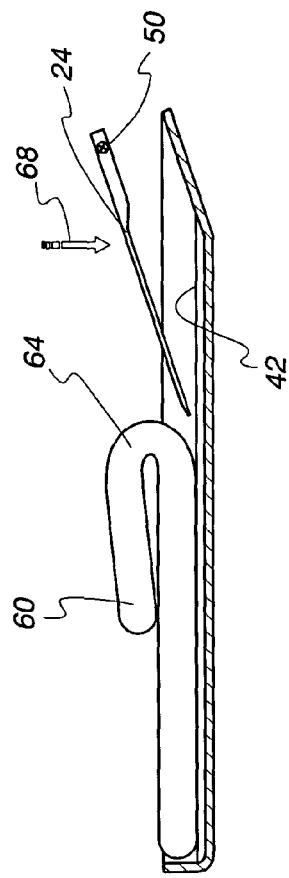

The angle of the spatulas and the ramps are important. Broadly, the angle of the ramp and spatulas range from about 1° to 40° from the horizontal, but in an important aspect, the angle of the ramp and spatulas range from about 10° to about 18° with 18° being shown in FIG. 5a. The angle of the spatula and ramp are about the same. As the pan moves downstream (as shown by arrow 54), and approaches the spatulas, the control rods lower the spatulas downward toward the bottom of the pan as shown with arrow 58 (FIG. 5a) and leading edge 48 of the spatula slides down the surface of ramp 46. At some point along the ramp or at the bottom of the pan, the leading edge of the spatula will slide under the cooked or coagulated egg 60 as seen in FIG. 5b. The angle of the spatula will lift the egg 60 off the bottom of the pan, and when the pan travels the distance of about one-third the length of the bottom, the control rod will rotate the top of the spatula 62 toward the upstream direction through to an angle of about 120° from the horizontal to make the first fold section 64 in the egg (see FIG. 5*c*). At the completion of the first fold 64, the control rods will move the first two rows of spatulas 20, 22 up and over the first fold. The first folded egg then moves to a second two lines 50, 52 (FIG. 4) of spatulas on control rods for a second fold as seen in FIG. 5*d*. As with the first two lines of spatulas 20, 22, the pans may be moving at such a speed, two lines of spatulas may be required to achieve a second fold in the eggs in two lines of pans where each line follows the other as seen in FIG. 4.

Figure 5E:
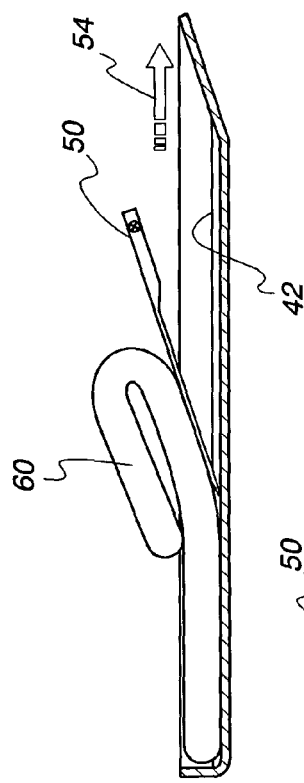
Figure 5F:
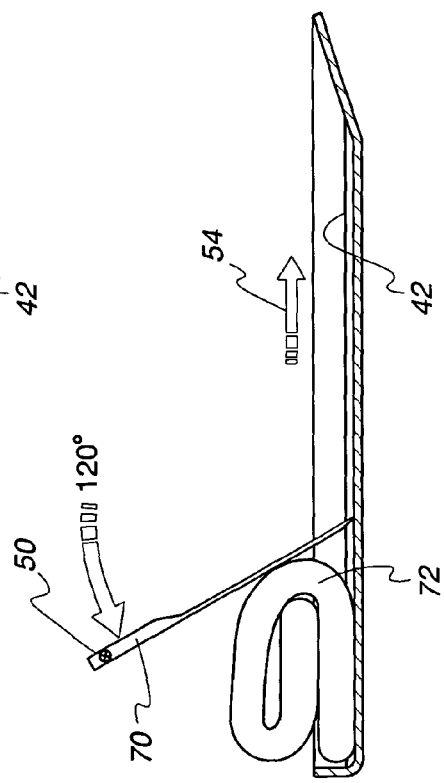

To achieve the second fold, the spatulas 24 move down, as seen by arrow 68, toward the bottom 42 of the pan (FIG. 5*d*) to slide under the first folded egg 60 at 64. As the pan with the egg moves downstream 54, the spatulas lift the egg up as seen in FIG. 5*e*. As the spatulas move about two-thirds the distance of the bottom of the pans, the control rods, such as 50, pivot the ends of the spatulas 70 mounted on the control rods to the upstream direction through to an angle of about 120° as seen in FIG. 5*f*. This will fold the second time as at 72, to make the trifolded egg.

Figure 6:
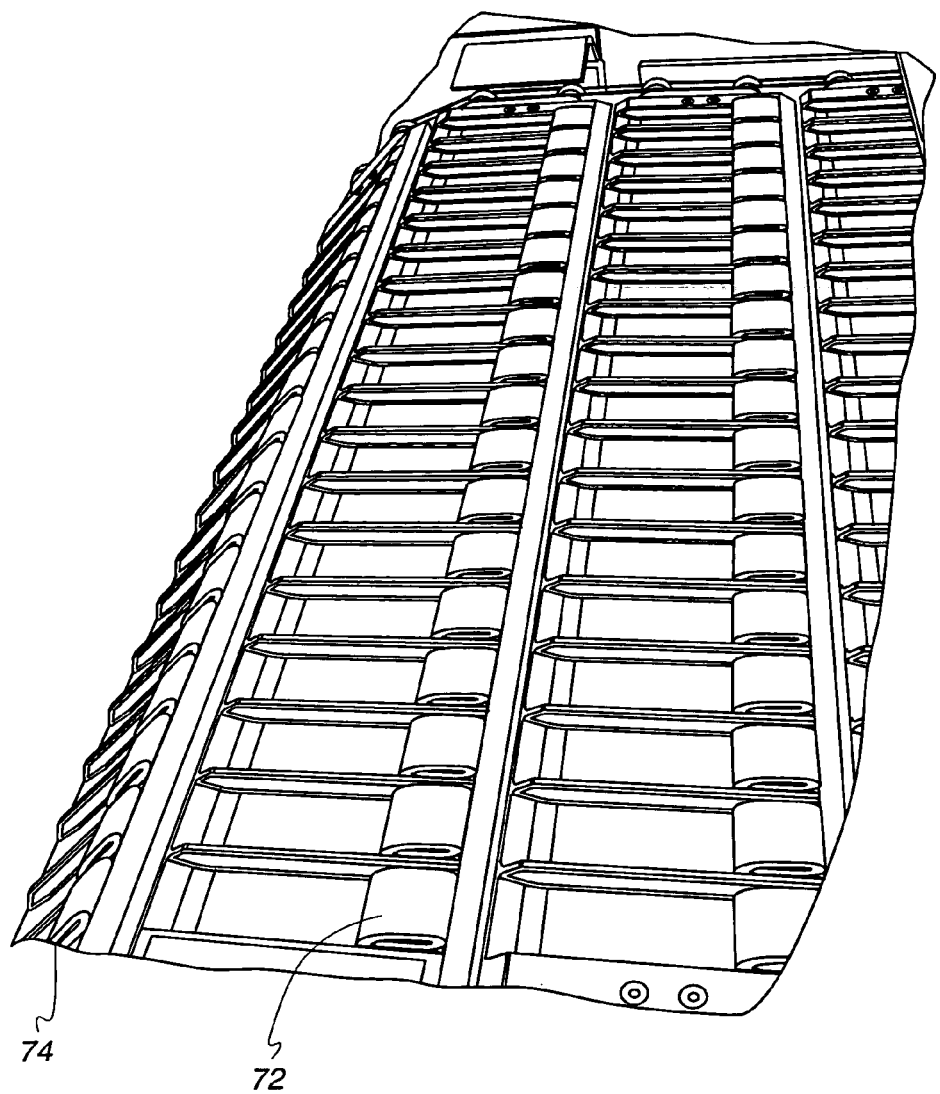
FIG. 6 shows the tri-folded egg in the pans as the pans move downstream from the spatulas.

As seen in FIG. 6, the trifolded egg continues to move downstream where the conveyor down turns the pans, as at 74, where the cooked folded eggs fall from the pan and are moved to a freezer (not shown) where the folded egg is frozen at preferably −40° F. to −60° F. for about 20-22 minutes or in an impingement freezer for 5 to 7 minutes.

Figure 7:
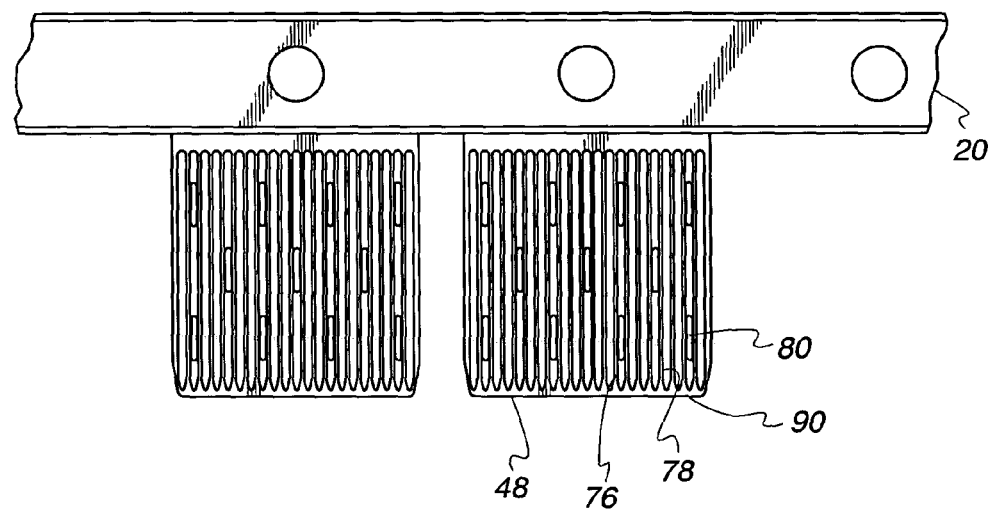
FIG. 7 is a top view of the spatulas mounted on a control rod.

The spatulas are made from a material which will provide a low-friction surface and which will be stable and heat resistant to a temperature of at least about 400° F. A resin commercially available from General Electric Plastics under the name of "Ultem 100F" will provide such a surface which also will be stable and provide a spatula which will resiliently engage the surface of the pan. Further, as seen in FIG. 7, the spatulas have a top surface which has ridges with peaks 76 and valleys 78 where the cooked egg engages the spatulas at the peaks. To minimize a vacuum forming between the egg patty and the surface of the spatula, an array of holes 80 extend through the body of the spatula. The leading edge 48 of the spatula is angled downwardly as seen at 90 in FIG. 5*a*. This angle helps the spatula to slide under the table.

Figure 8:
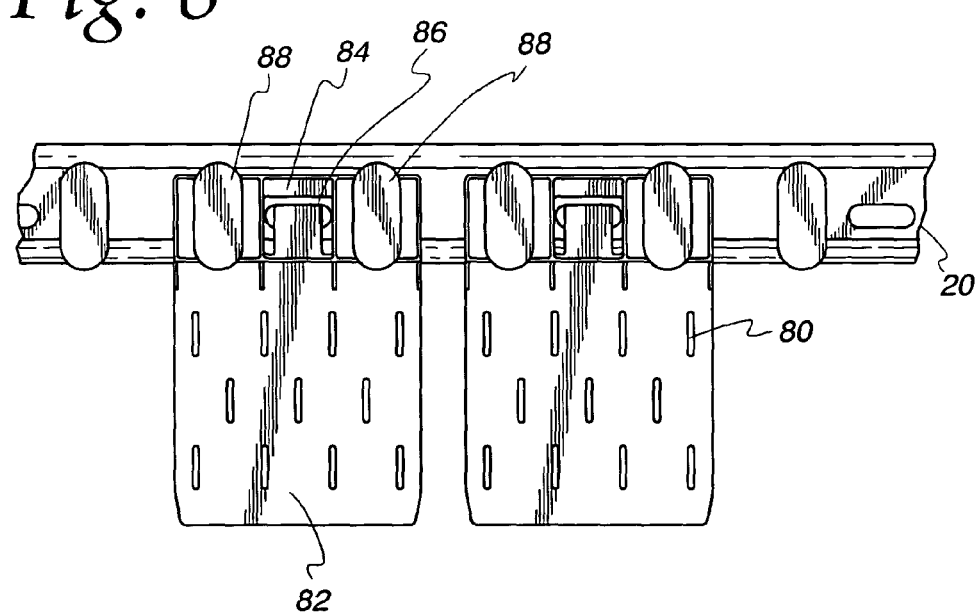
FIG. 8 is a bottom view of the spatulas mounted on a control rod.

As seen in FIG. 8, the bottom surface 82 of the spatula may be flat and smooth with the holes 80 extending through the body of the spatula. The spatulas are removable from the control rods as they are mounted on the control rods via a tung and grooves in the spatula. A tung 84 slides into a notch 86 in the control rod. Grooves in the spatula engage bosses or studs 88 extending from the control rod such that the combination of the tung and grooves frictionally hold the spatulas on the control rod, but also permit removal of the spatulas for maintenance.

A Composition Particularly Useful in the Invention

Unless defined otherwise, all technical and scientific terms used herein have the same meaning as commonly understood by one of ordinary skill in the art to which this invention belongs. All patents and publications referred to herein are incorporated by reference herein. For purposes of the present invention, the following terms are defined below.

"Liquid whole egg" means egg white and yolk in the ratio which is generally recognized as the ratio of yolk to white in shell eggs. That ratio generally is in the range of from about 1 part yolk to about 2 parts egg white. Liquid whole egg generally has about 23 to 24.5 weight percent solids and 76.5 weight percent water.

"Freeze-thaw stability" refers to an egg patty product that is capable of being frozen, thawed and then reheated such that product attributes of the resulting egg patty are similar to that of an egg patty that was prepared from fresh liquid whole egg that was not frozen and reheated. After reheating, the egg patty of the invention has a slightly mottled bright yellow color with a shiny surface. The external surface of the egg patty is slightly irregular with a porous or moon-cratered appearance. When the cooked egg patty is cut in half, the internal texture appearance is slightly striated in a vertical fashion and fold seams are barely detectable. When biting into the egg patty, the texture is light, tender and slightly moist. The product does not have a dry and crumbly feel or release an excess of free moisture. In an important aspect, the product is capable of going through at least one cycle of cooking, freezing and thawing.

"Flavor" refers to the natural whole egg flavor which is a multi-component mixture of natural and/or artificial flavoring ingredients.

As used herein, "edible material" includes any material that is generally regarded as safe by FDA and does not have to be removed from the food component before it is eaten (i.e., a material that can be safely chewed and ingested by the consumer).

As used herein, "a foldable egg patty" refers to a liquid whole egg product that is more readily foldable than liquid whole egg. To determine foldability of the egg patty according to the invention, that foldability is compared to a patty of scrambled liquid whole egg. In making the comparison, an egg blend as described herein (as well as a comparative patty of liquid whole egg) are cooked in a pan at a temperature as described. Before cooking, about 1.75 fluid ounces of the egg composition described herein is added to the pan which is about 3 inches wide by about 8½ inches long ⅝ inches deep with the ramp being about 0.7 inches long. After cooking the egg patties made from the egg composition is about 1.57 ounces and are tri-folded to provide an egg patty with a length of about 2¼ inches to about 3 inches, preferably a length about 2.61 inches, a width of about 2.63 inches to about 2.89 inches, preferably a width of about 2.75 inches, and a height of about 0.37 to about 0.54 inches, preferably about 0.45 inches. The egg composition described herein more readily folds than an egg patty made from just liquid whole egg.

To provide a egg patty with characteristics similar to fresh eggs, the egg patty is made from a composition which is an egg blend which includes liquid whole egg, an edible oil, an amount of freeze-thaw stabilizer effective for providing freeze-thaw stability, gum, flavor, phosphates and an amount of pH controller effective for providing a pH of 7.2 or less. The egg patty blend includes at least 90 weight percent, preferably from 95 to 98.5 weight percent, and more preferably 97 to 98 weight percent liquid whole egg based on the weight of the blend before cooking.

The freeze-thaw stabilizer blended with the liquid whole egg is effective for providing an egg patty with characteristic similar to fresh eggs after the blend is cooked, frozen, thawed and reheated. Generally this amount is from 0.5 to 3 weight percent freeze-thaw stabilizer based on the weight of the egg blend before cooking. Previously, xanthan gum was used as a freeze-thaw stabilizer. An important aspect of the present invention is using modified food starch as the freeze-thaw stabilizer which is effective for stabilizing the egg patty through at least one cooking, freezing, one thaw and reheating such that the reheated egg patty will have the characteristics of fresh scrambled or fresh eggs.

A modified food starch has better freeze/thaw stability properties than xanthan gum. Modified food starches for an egg patty may be made from tapioca, corn, or potato. A modified starch is cross-linked to form a structure which is effective to bind moisture in the egg to permit freezing and to provide a cook, freeze, thaw and reheat cycle as described above. In a very important aspect of the present invention, the modified food starch is cornstarch. Modified cornstarch has a strong crosslinked structure which can tolerate abusive processing conditions. Cornstarch will not begin to swell until it reaches a temperature of 140° F. or higher, Eggs in the blend of the invention will begin to cook at temperatures approaching 160° F. to 185° F.

Carrageenan gum also may be included in the egg blend. Carrageenan gum plays a dual role as a freeze/thaw stabilizer as well as a thickening agent. The gum increases the viscosity of the partially cooked egg blend which enables the cooking egg to be folded into thirds more easily when the product is slightly viscous. Carrageenan gum also aids in keeping the modified food starch of the egg patty formula suspended in solution. Typically, without the use of a thickening agent, the modified food starch will settle to the bottom of the mix in the silo or holding tank. Carrageen gum is used in amounts effective to achieve these objectives which amounts generally are from 0.03 to 0.085 weight percent, with a preferred amount of 0.075 weight percent based upon the weight of the uncooked egg blend. Examples of other gums which may be used in combination with the other ingredients in the egg blend include carrageenan, guar, xanthan, locust bean, gum arabic, or combinations thereof.

The egg blend may include water in an amount effective for providing the desired fluffy and tender appearance of fresh eggs. The water further allows the egg to rise to a desired height by creating steam within the egg blend during the cooking process. In this aspect of the invention, the egg patty may include from 1 to 5 weight percent water, based on the weight of the egg blend before cooking.

In another aspect, egg blend to make the egg patty includes an edible oil. The edible oil is effective for providing the egg patty with desired tenderness and organoleptic properties that resemble a patty made from fresh eggs that has not been frozen and reheated. The edible oil acts to provide the egg patty with a glossy sheen surface with a slightly irregular and dimpled texture, thereby aiding to the overall tenderness of the egg patty. Edible oils that may be used in the present invention include edible vegetable oils and may include oils selected from the group consisting of soybean oil, partially hydrogenated soybean oil, corn oil, canola oil, olive oil, sunflower oil, peanut oil, coconut oil, rapeseed oil, palm oil, palm kernel oil, cottonseed oil, and mixtures thereof. In this aspect of the invention, the egg blend includes from 1 to 3 weight percent edible oil, based on the weight of the blend before cooking.

In an very important aspect of the invention, the edible oil is soybean oil. Soybean oil adds tenderness to the egg patty ensuring the eggs are not dry and crumbing but slightly moist and tender. The soybean oil also gives the appearance of a glossy and irregular egg patty that is similar to fresh eggs.

The egg blend to make the egg patty further includes an amount of pH controller effective for providing and maintaining the egg patty with a bright yellow color. Compositions useful for controlling pH in the present invention include pH controllers selected from the group consisting of citric acid, sodium pyrophosphate, tetrasodium pyrophosphate, disodium phosphate, trisodium phosphate, monosodium phosphate and mixtures thereof. In this aspect of the invention, the egg blend includes from 0.05 to 0.3 weight percent pH controller, based on the weight of the egg patty blend before cooking. In a very important aspect of the invention, the pH controller is citric acid. Additionally, the egg blend to make the egg patty may include phosphates. Phosphates are used to preserve the rich yellow whole egg color like fresh eggs. Phosphates that may be used in the present invention include tetrasodium pyrophosphate, sodium acid pyrophosphate and monosodium phosphates. In this aspect of the invention, the egg patty includes 0.14 to 0.21 weight percent of the phosphates, based on the weight of the blend before cooking.

The egg blend to make the egg patty also includes natural whole egg flavor. The flavoring is added to maintain the whole egg flavor during storage and throughout the expected shelf life of the egg patty. Flavoring is also added to match the flavor of fresh scrambled eggs. The natural whole egg flavor is a multi-component mixture of natural and artificial flavoring ingredients. In this aspect, the egg patty includes 0.01 to 0.25 weight percent of the flavor ingredients, based on the weight of the blend before cooking. In one aspect, the flavor ingredients are whole egg flavor and are all natural ingredients.

The egg composition described herein is particularly useful for making the folded egg patty. In this aspect, liquid whole egg, an edible oil, an amount of freeze-thaw stabilizer effective for providing freeze-thaw stability, gum, flavor, phosphates and an amount of pH controller effective for providing a pH of pH of 7.2 or less, preferably a pH of 6.4 to 7.2, more preferably a pH of 6.8 to 7.1, and most preferably a pH of 7.0 to 7.1, are blended together. The blend then is cooked by depositing the composition into a pan having a temperature of from 220° F. to 310° F., preferably 255° F. to 285° F. After deposit of the liquid whole egg composition on the surface having a temperature of from 250° F. to 300° F., the egg composition is allowed to cook without application of additional external heat for 30 to 180 seconds, preferably 30 to 65 seconds, and more preferably about 62 seconds. With the cooking apparatus described herein, the pans with the egg move through the heating apparatus at a speed of about 36 feet/minute to cook the egg composition preferably at 285° F. for about 62 seconds.

After cooking, the egg patty may be transferred to a freezer having a temperature of −60° F. to 0° F., preferably −55° F. for a dwell time of 5 to 7 minutes, preferably 6.1 minutes in an impingement freezer, or from 20 to 22 minutes in a regular freezer.

In one aspect, the folded egg patties are packaged in flat packs of polymeric film by placing the folded egg patties onto a film surface, sealing the patties, preferably as a single layer, between the bottom and a top layer of film. Films which may be used include multilayered films such as a 48 Ga. polyester with 1.5 to 2 mils modified polyethylene film for a total film thickness of about 2 mils for the top layer; and 3.5 mil nylon coextrusion film for the bottom layer of the flat pack. Thereafter, the sides of the flat pack are sealed. The flat packs of folded egg patties generally may have 12 patties per pack (in a 4 patty by 3 patty array) which pack may be sealed and cased in cases with 32 packs per case. In an important aspect this packaging is after freezing of the folded egg patties. The flat packs are ideal for readily thawing and reheating the frozen folded egg patties at the point of serving a food product which includes a reheated folded egg patty.

The folded egg patties in the flat pack may be quick thawed in a microwave oven or gradually thawed and stored in unused thawed packs in racks in a cooler which does not keep the folded egg patties in a frozen condition. To quick thaw the frozen folded egg patties, the patties may be individually thawed in a microwave oven after removal from the flat pack. Alternatively, an entire flat pack may be placed in a microwave oven for thawing, such as at high power for 20 seconds and then 90 seconds at 70% power for each side of the flat pack. This means the pack is heated for 20 and 90 seconds as described, then the pack is flipped over with the heating repeated. After thawing the packs are opened and the folded egg patties removed from the pack for reheating, such as on a grill, for consumption. At the latter point the thawed folded egg patties are heated to 140° F. or above, preferably from 140° to 190° F.

Gradual thawing of the flat packs provides a unique way to thaw and store flat packs in a non-frozen condition. Using the racks to thaw the folded egg patties, the flat packs are placed into the rack, preferably as single layers of flat packs. The racks have shelves which are grates made of heavy metal wire such that air can circulate above and below the flat racks for efficient thawing. The heavy wires are spaced from the other and form a lattice or screen-like bed upon which the flat packs rest to expose the top and bottom of the packs to circulating thawing air. The racks have several shelves or lattice beds upon which the flat packs can rest. In a preferred arrangement, the racks are 16 inches deep, 18 inches wide and 14 inches high. Such a rack with twelve shelves will accommodate one flat pack per shelf and will permit thawing of the folded egg patties on the rack being held in a cooler or atmosphere having a temperature of 34° F. to 36° F. in 18 hours. In this connection, "thaw" means that the egg patties reach a temperature of 31° F. or higher. The spacing of the shelves, the spaces between the wires and the gage of the wires are all such that the racks are effective to provide the aforementioned thawing. Racks which are 16 inches deep, 18 inches wide and 14 inches high with shelves made of 8 gauge wire forming 1 inch by 1 inch open squares will permit such thawing. The racks also may include wheels to permit them to be wheeled from a freezer and moved into a thawing area, and then wheeled into a cooler as needed.

The following examples illustrate methods for carrying out the invention and should be understood to be illustrative of, but not limiting upon, the scope of the invention which is defined in the appended claims.

What is claimed is:

1. A method of folding a plurality of cooked eggs, the method comprising:
    adding liquid egg into a plurality of cooking pans in an endless linear array, the pans having at least three side walls, a bottom and a ramp which extends downward to the bottom, the array of pans movable as an endless conveyor;
    cooking the eggs in the pans where they at least have begun to coagulate in the pans;
    moving the coagulated egg in the pans toward a plurality of spatulas having bodies which are generally flat in an array above the pans, the spatulas rotatable about an axis which is perpendicular to the linear array of pans, the spatulas movable upwardly away from the pans and downwardly toward the pans;
    moving a leading edge of the spatulas down onto the downwardly extending ramp of the pans as the pans move toward the flat spatulas, the flat spatulas being held at an angle that is about the angle of the downwardly extending ramp at a point of engagement of the spatula with the ramp; and
    rotating the flat spatulas through an angle that is effective for folding the coagulated egg over onto itself as the pans move past the spatulas toward the downstream end of the endless linear array.

2. The method as recited in claim 1 where the angle of the ramp is from 1° to 40°.

3. The method as recited in claim 2 where the angle of the ramp is from 10° to 18°.

4. The method as recited in claims 3 wherein the spatulas are rotatable to an angle of 120° from the horizontal to fold the cooked egg in the pan.

5. The method as recited in claim 3 or 4 wherein the flat spatulas have ridges on surfaces which will engage the eggs without frictionally holding the eggs on the ridged surfaces of the spatulas, the spatulas further including at least one hole through the planar body which hole will be effective in avoiding formation of a vacuum which will hold the eggs on the ridged surface of the spatulas.

6. A method for cooking and folding liquid whole eggs, the system comprising:
    adding an egg blend into a plurality of cooking pans in an endless linear array, the pans having at least three side walls, a bottom and a ramp which extends downward to the bottom, the array of pans movable as an endless conveyor, the egg blend comprising at least 90 weight percent liquid whole egg, an edible oil, an amount of freeze-thaw stabilizer effective for providing freeze-thaw stability to the blend after it is cooked, and an amount of pH controller effective for providing the blend with a pH of 7.2 or less;
    cooking the egg blend in the pans for a time and temperature which is effective to coagulate the eggs to a consistency which permits the coagulated egg blend to be folded;
    moving the coagulated egg blend in the pans toward a plurality of spatulas having bodies which are generally flat in an array above the pans, the spatulas rotatable about an axis which is perpendicular to the linear array of pans, the spatulas movable upwardly away from the pans and downwardly toward the pans;
    moving a leading edge of the spatulas down onto the downwardly extending ramp of the pans as the pans move toward the flat spatulas, the flat spatulas being held at an angle that is about the angle of the downwardly extending ramp at a point of engagement of the spatula with the ramp; and
    rotating the flat spatulas through an angle that is effective for folding the coagulated egg blend over onto itself as the pans move past the spatulas toward the downstream end of the endless linear array.

7. The method as recited in claim 6 where the angle of the ramp is from 1° to 40°.

8. The method as recited in claim 7 where the angle of the ramp is from 10° to 18°.

9. The method as recited in claims 8 wherein the spatulas are rotatable to an angle of 120° from the horizontal to fold the cooked egg in the pan.

10. A method for cooking and folding liquid whole eggs, the system comprising:
    adding an egg blend into a plurality of cooking pans in an endless linear array, the pans having at least three side walls, a bottom and a ramp which extends downward to the bottom, the array of pans movable as an endless conveyor, the egg blend comprising from 95 to 98.5 weight percent liquid whole egg, from 1 to 3 weight percent edible oil, from 0.01 to 0.25 weight percent flavor, from 0.15 to 0.21 weight percent phosphates, an amount of a modified food starch effective for providing freeze-thaw stability to the egg patty, an amount of gum effective to suspend the modified food starch in the blend, and an amount of a pH controller effective for providing the blend with a pH of 7.2 or less, the oil, the modified food starch, the gum in amounts effective for providing an egg patty made from the egg blend with foldability which is greater than an egg patty of the same size and thickness made from liquid whole egg, the modified food starch selected from the group consisting of modified corn starch, modified potato starch, modified tapioca starch and mixtures thereof, the edible oil is selected from the group consisting of soybean oil, partially hydrogenated soybean oil, corn oil, canola oil, olive oil, sunflower oil, peanut oil, coconut oil, rapeseed oil, palm oil, palm kernel oil, cottonseed oil, and mixtures thereof;

cooking the egg blend in the pans for a time and temperature which is effective to coagulate the eggs to a consistency which permits the coagulated egg blend to be folded;

moving the coagulated egg in the pans toward a plurality of spatulas having bodies which are generally flat in an array above the pans, the spatulas rotatable about an axis which is perpendicular to the linear array of pans, the spatulas movable upwardly away from the pans and downwardly toward the pans;

moving a leading edge of the spatulas down onto the downwardly extending ramp of the pans as the pans move toward the flat spatulas, the flat spatulas being held at an angle that is about the angle of the downwardly extending ramp at a point of engagement of the spatula with the ramp; and rotating the flat spatulas through an angle that is effective for folding the coagulated egg blend over onto itself as the pans move past the spatulas toward the downstream end of the endless linear array.

11. The method as recited in claim 10 wherein the egg blend is cooked by depositing it into the pans having a temperature of from 220° F. to 310° F. and moving it through an elongated oven to cook without application of additional external heat for 30 to 180 seconds.

12. A method for cooking, folding, freezing and packaging a plurality of frozen folded frozen egg patties, the method comprising:

adding an egg blend into a plurality of cooking pans in an endless linear array, the pans having at least three side walls, a bottom and a ramp which extends downward to the bottom, the array of pans movable as an endless conveyor, the egg blend comprising at least 90 weight percent liquid whole egg, an edible oil, an amount of freeze-thaw stabilizer effective for providing freeze-thaw stability to the blend after it is cooked, and an amount of pH controller effective for providing the blend with a pH of 7.2 or less;

cooking the egg blend in the pans for a time and temperature which is effective to coagulate the eggs to a consistency which permits the coagulated egg blend to be folded;

moving the coagulated egg blend in the pans toward a plurality of spatulas having bodies which are generally flat in an array above the pans, the spatulas rotatable about an axis which is perpendicular to the linear array of pans, the spatulas movable upwardly away from the pans and downwardly toward the pans;

moving a leading edge of the spatulas down onto the downwardly extending ramp of the pans as the pans move toward the flat spatulas, the flat spatulas being held at an angle that is about the angle of the downwardly extending ramp at a point of engagement of the spatula with the ramp;

rotating the flat spatulas through an angle that is effective for folding the coagulated egg blend over onto itself as the pans move past the spatulas toward the downstream end of the endless linear array to provide a plurality of cooked folded egg patties; and freezing and packaging the plurality of cooked folded egg patties to provide flat packs of frozen folded egg patties comprising a plurality of frozen folded egg patties which are arrayed as a layer of frozen folded patties sealed between a top and bottom layer of polymeric film which form the top and bottom of the package.

13. The method of claim 12 wherein said spatulas have a body with a top surface which has ridges with peaks and valleys, and holes extend through said body.

14. The method of claim 12 further comprising:

providing racks with shelves which are grates which are effective to expose the top and bottom of the package to thawing air; and placing the packages on the shelves for thawing.

15. The method of claim 14 wherein the grates are made of metal wires which are spaced from the other, the distance between the shelves, the gauge of the wires, and the spacing between the wires are effective for thawing the folded egg patties, which have been frozen at about −55° F. for 5 to 7 minutes, in about 18 hours in an atmosphere having a temperature of about 34 to 36° F.

16. A method for cooking, folding, freezing, packaging a plurality of frozen folded egg patties and thawing the packaged frozen folded egg patties, the method comprising:

adding an egg blend into a plurality of cooking pans in an endless linear array, the pans having at least three side walls, a bottom and a ramp which extends downward to the bottom, the array of pans movable as an endless conveyor, the egg blend comprising at least 90 weight percent liquid whole egg, an edible oil, an amount of freeze-thaw stabilizer effective for providing freeze-thaw stability to the blend after it is cooked, and an amount of pH controller effective for providing the blend with a pH of 7.2 or less;

cooking the egg blend in the pans for a time and temperature which is effective to coagulate the eggs to a consistency which permits the coagulated egg blend to be folded;

moving the coagulated egg blend in the pans toward a plurality of spatulas having bodies which are generally flat in an array above the pans, the spatulas rotatable about an axis which is perpendicular to the linear array of pans, the spatulas movable upwardly away from the pans and downwardly toward the pans;

moving a leading edge of the spatulas down onto the downwardly extending ramp of the pans as the pans move toward the flat spatulas, the flat spatulas being held at an angle that is 1 about the angle of the downwardly extending ramp at a point of engagement of the spatula with the ramp;

rotating the flat spatulas through an angle that is effective for folding the coagulated egg blend over onto itself as the pans move past the spatulas toward the downstream end of the endless linear array to provide a plurality of cooked folded egg patties;

freezing and packaging the plurality of cooked folded egg patties to provide flat packs of frozen folded egg patties comprising a plurality of frozen folded egg patties which are arrayed as a layer of frozen folded patties sealed between a top and bottom layer of polymeric film which form the top and bottom of the package; and thawing the frozen folded egg patties in the flat packs by microwaving the flat packs or providing racks with shelves which are grates which are effective to expose the top and bottom of the package to thawing air and placing the packages on the shelves for thawing to provide thawed folded egg patties; and reheating the thawed frozen egg patties.

17. The method of claim 16 wherein the thawed folded egg patties are reheated to a temperature of at least 140° F.

18. The method of claim 12 further comprising moving the plurality of cooked folded egg patties in the pans toward a plurality of additional spatulas having bodies which are generally flat in an array above the pans, the additional spatulas rotatable about an axis which is perpendicular to the linear array of pans, the additional spatulas movable upwardly away from the pans and downwardly toward the pans.

\* \* \* \* \*